United States Patent
Feuerherm et al.

(10) Patent No.: US 6,284,169 B1
(45) Date of Patent: *Sep. 4, 2001

(54) METHOD OF EXTRUSION BLOW MOLDING OF A HOLLOW BODY

(75) Inventors: Harald Feuerherm, Im Laach 33, D-53840 Troisdorf; Rolf Kappen-Feuerherm, Troisdorf, both of (DE)

(73) Assignee: Harald Feuerherm, Troisdorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/277,001

(22) Filed: Mar. 26, 1999

(30) Foreign Application Priority Data

Mar. 27, 1998 (DE) .............................. 198 13 863
Apr. 24, 1998 (DE) .............................. 198 18 519

(51) Int. Cl.⁷ .................................. B29C 39/02
(52) U.S. Cl. .................. 264/40.1; 264/541; 264/167; 425/532; 425/465; 425/466; 425/381
(58) Field of Search .................. 264/541, 40.1, 264/167; 425/532, 466, 465, 140, 141, 381

(56) References Cited

U.S. PATENT DOCUMENTS 5,840,223 * 2/2000 Feuerherm et al. ................ 264/40.1
6,024,557 * 2/2000 Feuerherm ........................ 425/532

OTHER PUBLICATIONS

"Beeinflussung Der Wanddicke Bei Der Hohlkorperfertigung", Ing.Volker Voelz, Pastverarbeiter 32, Jahrgang 1981 No.3, 5 pages.

* cited by examiner

Primary Examiner—Jan H. Silbaugh
Assistant Examiner—Suzanne E McDowell
(74) Attorney, Agent, or Firm—Herbert Dubno

(57) ABSTRACT

The extrusion blow molding of hollow bodies is carried out with a wall thickness program which in addition to varying the gap width over the entire perimeter of the gap in accordance with a first program curve and varying the geometry of the gap in response to a second program curve, automatically enhances a profiling of the preform to increase differences between the thick and thin regions with the variation in geometry when the gap width is greater in a reference value and diminishes the profiling of the preform to decrease such differences when the gap width is less than the reference value.

14 Claims, 13 Drawing Sheets

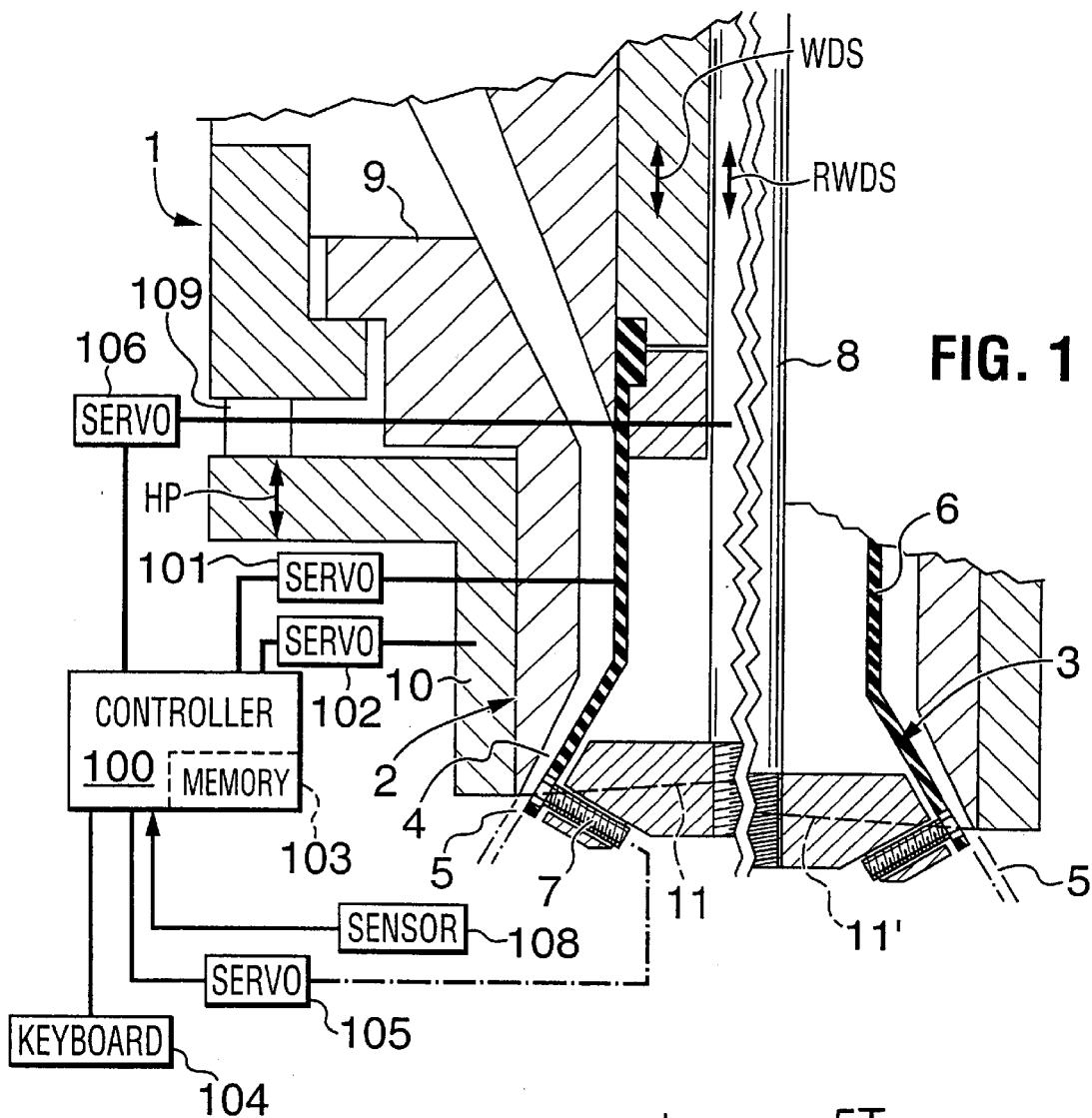

_US 6,284,169 B1_

METHOD OF EXTRUSION BLOW MOLDING OF A HOLLOW BODY

FIELD OF THE INVENTION

Our present invention relates to a method of extrusion blow molding of a hollow body and, more particularly, to a method in which a tubular preform is extruded through an extrusion nozzle gap in an extrusion blow molding head. The preform is enclosed in a blow mold and the preform is then blown so that the walls of the thermoplastic synthetic resin material constituting the preform can press against the cooled mold walls and are thereby shaped with an outer configuration complementary to the internal configuration of the mold.

BACKGROUND OF THE INVENTION

Blow molding of hollow articles is described, for example, in the commonly assigned copending application Ser. No. 09/132,350 which was filed Aug. 12, 1998 as a division of Ser. No. 08/758,490 (now U.S. Pat. No. 5,840,223, issued Nov. 24, 1998), filed Nov. 29, 1996, both of which are based upon German Patent Document 19544634 of Nov. 30, 1995. In that application, among other things, various systems of controlling the blow molding operation have been set forth.

In prior methods for extrusion blow molding of hollow bodies, especially for the production of canisters, containers, fuel receptacles for vehicles (gasoline tanks) and the like, it has been necessary to take into consideration the fact that the shape of the body may deviate from a cylindrical geometry.

In earlier systems the tubular preform has been extruded through an annular nozzle gap between a mandrel and a nozzle ring and the nozzle gap width and its geometry could be controlled in accordance with a wall thickness program and/or as a function of the length of the preform extruded from the gap.

For example, an axial movement of the mandrel and/or the nozzle ring could be generated in accordance with a first programming curve (WDS) of a wall thickness program to vary the gap width over the entire perimeter. The nozzle gap geometry could be varied in response to a second programming curve (RWDS) of the wall thickness program.

In the case of hollow bodies to be made by an extrusion blow molding process, where a cylindrical blow molded structure is to be formed, there is a sag of the preform based upon its own weight. The degree of sag is a function of the weight of the preform, the viscosity of the plastified synthetic resin material at the particular instantaneous preform temperature or the stiffness of that material, and the time for which the preform has been hanging. The sag can give rise to changes in the preform diameter and at least in upper regions thereof to a reduction in the wall thickness to the point that the preform will unintentionally tear away from the blow molding head. These effects can be compensated in part by enlargement of the gap width as a function of the extruded preform length. The control of the gap width here is effected in a accordance with a programming curve, also known as wall thickness control (WDS), which regulates the axial position of the mandrel or the nozzle ring and can vary the nozzle gap width over the entire perimeter of the gap. Each control operation is repeated with each cycle and takes place during the extrusion of the preform and hence has been termed a dynamic control.

In combination with the described dynamic width control, a dynamic control has also been effected and repeated for each machine cycle, of the nozzle gap geometry, based upon a second programming curve, also known as radial wall thickness control (RWDS). The second programming curve runs synchronously with the axial wall thickness control in the preform length direction and operates an effector or setting device which varies the gap geometry.

In practice a variety of techniques can be used to effect control in accordance with these two curves. Advantageously the dynamic control of the nozzle gap geometry can be carried out by adjusting either the inner side or wall of the nozzle gap thereof by displacing a deformable sleeve which delimits one side of the gap based upon the value given by the programming curve which is a function of time or extruded length, both being equivalent for a preform formed at a constant flow rate.

Auxiliary and radially adjustable sliders can be used which can be shifted into and out of the flow passage for the plastic melt based upon the RWDS programming curve value and within the blowing head or at the end of the nozzle. The dynamic regulation of the nozzle gap geometry can be used to generate thicker and thinner regions in the cross section of the preform, i.e. in the profile thereof so that, where the wall portions are stretched to a greater extent in blowing, i.e. at the corners, sufficient material will be provided to allow the production of the canisters and containers where the desired thickness of material and to permit formation of the bottoms and tops of such hollow bodies, at which additional material may be required beyond that for the formation of the walls. The shape variation permits the thick and thin regions to be shifted in the peripheral direction and to be a function of the gap width. A process describing this type of control is found in Plastverarbeiter 32, (1981) Number 3, pages 326–330.

In the extrusion blow molding of noncylindrical hollow bodies, hollow bodies with rectangular cross sections, like fuel tanks for Rotor vehicles and the like, preforms are extruded which have thick regions and/or thin regions with a certain distribution around the periphery and can extend over all or apart of the length of the preform. In conventional systems the nozzle gap geometry for this purpose can be adjusted manually. The setting can be effected, for example, by set screws which operate upon the deformable sleeve. The setting of the nozzle gap geometry in combination with an axial positioning of the mandrel and/or the nozzle ring for influencing the nozzle gap width over the entire perimeter thereof, does not, however, suffice when one must fabricate hollow bodies of uniform wall thickness which deviate significantly from a circular cross section.

OBJECTS OF THE INVENTION

It is, therefore, the principal object of the present invention to provide a method of extrusion blow molding whereby hollow bodies can be fabricated with cross sections deviating significantly from the circular and with predetermined wall thicknesses.

More specifically it is an object of the invention to provide an improved method of making extruded blow molded bodies, which can be rectangular canisters or containers or vehicle fuel tanks of complex shapes and wherein the wall thicknesses must be maintained within narrow ranges even at columns or bulges in the container shape and whereby drawbacks of earlier systems are avoided.

Still another object of the invention is to provide a method which will yield products of improved uniformity and reproducibility and which can be practically of any cross sectional shape with practically any arrangement of thick and thin regions about the perimeter thereof.

SUMMARY OF THE INVENTION

These objects are attained in accordance with the invention by a method of extrusion blow molding of hollow bodies by providing the mandrel and/or the nozzle ring of such a cross sectional profile as will generate thick regions and/or thin regions along the melt stream and by controlling the cross sectional profile of the mandrel and/or the nozzle ring independently of the control of the nozzle gap geometry in accordance with the second programming curve, so that the profiling of the tubular preform emerging from the gap is enhanced when the nozzle gap width is greater than a reference value and diminishing the profiling of the extruded preform when the nozzle gap width is smaller than the reference value. Within the sense of the invention, enhancement of the profiling means that the wall thickness difference between the thick regions and the thin regions is increased. Correspondingly when the profiling is diminished we mean to indicate that the difference between the measured wall thickness at the preform at the thick regions and the neighboring thin regions is correspondingly smaller.

The invention is based upon the fact that the effect of a profiling of the nozzle gap, i.e. a deviation from a purely and true cylindrical configuration by imparting a wave formation around the perimeter, is dependent upon the gap width as set dynamically by the wall thickness control when the gap width is large, the effect of a constant profile on the blow molding result is significantly less than is the case when the gap width is small. As a consequence, the profile must be matched to the gap width to ensure a comparatively uniform wall thickness in the stretching of the synthetic resin materials resulting from the expansion of the preform in the blow mold and hence the method of the invention can be used especially effectively for the fabrication of containers with thick wall and thin wall regions in which predetermined thicknesses and thickness ratios can be maintained with ease.

The advantages of the invention are also applicable in the case in which the synthetic resin materials sag at the operating temperature because of the particular materials used and even in the case where there is a sharp slope in the axial wall thickness profile curve, i.e. the first programming curve WDS. It is particularly advantageous for continuous extrusion processes and/or wherein readily flowable synthetic resin materials are used.

According to a feature of the invention, the profile of the mandrel and/or the nozzle ring is modified as a function of a further program curve which is determined based upon the first programming curve (WDS) and has also been described herein as the lift dependent program curve (HP) and which also can be a function of the extruded length of the preform so that the ratio of the thick regions and thin regions during running of the programming curves is independent from the nozzle gap width given by the first programming curve (WDS) and maintained approximately constant.

The programming curve HP can represent a function which can be formed by a multiplication of the values of the first programming curve by a profile factor (F) wherein F is <1. Since the profiling factor is less than 1, the curve HP may represent a compression of the programming curve WDS. The method of the invention can be used in cases of complicated hollow body geometry to improve the formation of the preform and to eliminate problems at the start and end of the preform. In the case of a highly profiled nozzle gap, a complete closure of the nozzle gap at the start and end of the extrusion process or during the filling of the extrusion head accumulator is not possible. Open portions of the gap remain from which the synthetic resin material can run out. The outflow at the highly profiled open regions can be so great that the preform itself does not properly pass over the blowing mandrel and thus cannot be blown into a usable product. Extremely thick regions and very thin regions usually must extend over the entire length of the preform including those regions of greater material accumulation which are to form the bottom wall and top wall of the container and the inability to completely control the flow has been found to have a negative effect in these regions. All of these problems can be removed by control of the preform extrusion gap with the wall thickness program described in conjunction with the ability to practically completely close down and open the gap.

In one advantageous construction, a conical wall portion of the mandrel or ring is provided with the profiling formations which can have a depth which is reduced in the direction of flow, i.e. toward the outlet. The shifting of the mandrel or the ring or a part adjacent the mandrel or the ring can be used to enhance or diminish the profiling produced by the profiled wall of the mandrel or ring.

The profiling may be effected by recesses provided in this wall. In another feature of the invention the mandrel or the nozzle ring is surrounded by an elastic sleeve and effectors are provided to deform this sleeve.

The method of the invention can then comprise the steps of:

(a) extruding a tubular preform through an extrusion-nozzle gap externally delimited by a nozzle ring and internally delimited by a mandrel wherein the ring and the mandrel are relatively axially shiftable to vary a gap width;

(b) automatically controlling the gap width and a geometry of the extrusion-nozzle gap in response to at least one control variable selected from a wall-thickness program and an extruded length of the preform by at least the steps of:

(b1) varying the gap width over an entire perimeter of the gap by axially shifting at least one of the ring and the mandrel in accordance with a first program curve (WDS) of the wall-thickness program, and (b2) varying the geometry with at least one effector in response to a second program curve (RWDS) of the wall-thickness program;

(c) forming at least one of the mandrel and the ring with a cross sectional shape selectively generating thick regions and thin regions of a synthetic resin melt as it is extruded through the gap to produce the preform and independently of the variation in the geometry in response to the second program curve (RWDS) of the wall-thickness program;

(d) enhancing a profiling of the preform to increase differences between the thick and thin regions with the variation in geometry when the gap width is greater than a reference value and diminishing the profiling of the preform to decrease differences between the thick and thin regions with the variation in geometry when the gap width is less than the reference value; and (e) blowing the preform in a blow sold to produce one of the hollow bodies from each preform extruded from the gap.

In its apparatus aspect, the apparatus for extrusion blow molding of the hollow body can comprise:

an extrusion head having a flow passage for a synthetic resin melt communicating with an annular extrusion-nozzle gap delimited internally by a mandrel member and externally by a nozzle ring member, the members having conical end portions defining the gap;

a flexible sleeve on at least one of the members formed with radially effective elements for deforming the sleeve;

at least one effector acting upon the elements and at least one effector acting upon one of the members for relatively axially displacing the members; and control means programmed with a wall-thickness program and connected to the effectors for automatically controlling a width of the gap and a geometry of the gap in response to at least one control variable selected from the wall-thickness program and an extruded length of the preform by at least the steps of:

varying the gap width over an entire perimeter of the gap by axially shifting at least one of the members in accordance with a first program curve (WDS) of the wall-thickness program, and varying the geometry with at least one of the effectors in response to a second program curve (RWDS) of the wall-thickness program, at least one of the conical end portions defining a cross sectional shape selectively generating thick regions and thin regions of the melt as it is extruded through the gap to produce the preform and independently of the variation in the geometry in response to the second program curve (RWDS) of the wall-thickness program; and means for enhancing a profiling of the preform to increase differences between the thick and thin regions with the variation in geometry when the gap width is greater than a reference value and diminishing the profiling of the preform to decrease differences between the thick and thin regions with the variation in geometry when the gap width is less than the reference value.

The term "effector" as has been used herein can include any electrically or fluid operated driver, usually under servo control and, more particularly, under the control of a computer.

BRIEF DESCRIPTION OF THE DRAWING

The above and other objects, features, and advantages will become more readily apparent from the following description, reference being made to the accompanying drawing in which:

FIG. 1 is a longitudinal section through a blowing head for extrusion blow molding of hollow bodies, especially rectangular canisters, containers and fuel tanks;

FIG. 2. is a diagram showing the nozzle gap geometry at the nozzle outlet;

FIG. 6b is a section along the line VIb—VIb of FIG. 6a;

SPECIFIC DESCRIPTION

Figure 3:
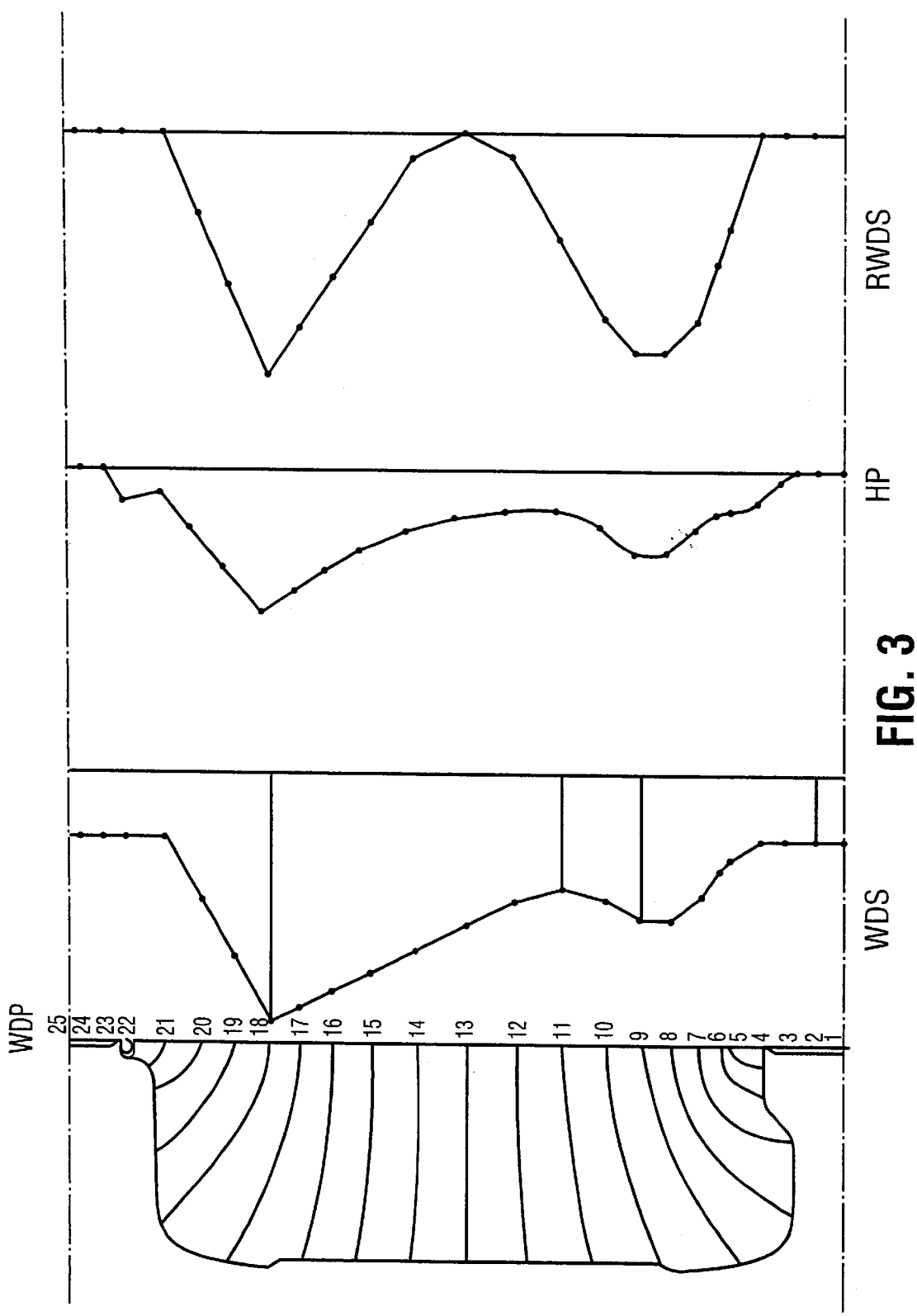
FIG. 3 is a graph of the wall thickness program showing the various programming curves thereof as a function of time or length of the extruded preform.

The partial axial section of the extrusion head shown in FIG. 1, can be found, according to the invention, in an apparatus for the extrusion blown molding of hollow bodies, canisters, containers, and, especially, plastic gasoline receptacles. It comprises a nozzle housing 1 with a nozzle ring 2 cooperating with an axially shiftable mandrel 3. The relative axial displacement of the ring 2 and the mandrel 3 can be effected by a programmed controller 100 connected to respective effectors such as servomotors 101 and 102. The programmed memory of the controller, which may be a microprocessor based controller, has been represented at 103 and an input can be provided from the keyboard 104 of, for example, the reference value discussed in greater detail below.

The mandrel 3 and the nozzle ring 2 delimit from the inside and outside, respectively, a nozzle gap 4 from which a tubular preform 5 is extruded.

The mandrel 3 is equipped with an elastically deformable sleeve 6 upon which radially acting effectors 7 arrayed around the periphery of the gap, can act to deform the inner wall of the gap under the control of the computer 100 via respective servomotors, one of which has been shown at 1105 in FIG. 1. By the deformation of the sleeve 6, the nozzle gap geometry (shape is a variable around the perimeter of the gap. The flow of melt from the gap has thick regions and thin regions as represented at 5T and 5t or 5'T and 5't (FIG. 2).

The displacement of all of the effectors 7 upwardly and downwardly is afforded by a common positioning rod 8 which itself is operated by a servomotor 106 from the computer/controller 100. When the rod 8 is moved upwardly, the bulges formed in the sleeve 6 by the effectors 7 increase and the recesses decrease since the periphery of engagement of the effectors with the sleeve remains constant.

The nozzle ring 2 in the embodiment of FIG. 1 can comprise a ring 9 which is axially fixed on the machine frame and cooperates with an axially shiftable profiled sleeve 10 whose end 11 is formed with a wave shape and profile. The end of the ring 9 can also have such a wave shape profile, imparting the wave shape 111 to the extruded preform 5. The sleeve 10 can be retracted until it abuts a stop 109 relative to the sleeve 9, in which position the sleeve 10 has no effect on the preform (left position in FIG. 1). When, however it is advanced by the end of the ring 9 (right hand position in FIG. 1), the sleeve 10 becomes effective and the wave shape profile is defined by the sleeve 10 rather than the ring 9. The heavier preform shown at the right side of FIG. 2 is thereupon produced while the lighter preform is formed when the ring 9 is effective. Thus while the thick and thin regions are determined by the effectors 7, enhancement of the profiling of the preform to increase difference between the thick and thin regions and to decrease differences can be accomplished by switching between the ring 9 and the sleeve 10 as the preform defining outlet portions of the gap.

In the extrusion blow molding operation, the tubular preform 5 is extruded from the gap 4, is enclosed in a blow mold and blown therein to the hollow body, namely, one of the types of containers mentioned. The gap width and the gap geometry are defined by a wall thickness program and/or as a function of the extruded preform length (the extruded preform length being monitored by a sensor 108 providing an input to the computer 100). The control is effected in accordance with program curves of a wall thickness program schematically represented in FIG. 3. Based upon a first program curve WDS of the wall thickness program, the relative axial positions of the mandrel and ring 2 are controlled by axially shifting the mandrel 3, thereby varying the nozzle width over the entire periphery of the nozzle. In an alternative, of course, the gap width over the entire perimeter can be varied by axially shifting the ring 2 and holding the mandrel 3 stationary.

Depending upon a second program curve RWDS of the vall thickness program the nozzle gap geometry is varied. In the embodiment of FIG. 1 this is achieved by shifting the rod 8 which carries all of the effectors 7, relative to the sleeve 6, thereby changing the shape of the gap between the sleeve and the ring. There are other possibilities for modifying the gap geometry, namely, individual operation of the effectors 7 by the computer, thereby providing a dynamic response to the second program curve RWDS.

In any event, according to the invention, the profile 11' of the preform, i.e. its cross sectional shape, will have thick regions and thin regions in the outflowing melt and will be a wave form. It is this profiling of the melt flow which is enhanced or diminished as represented by the arrow HP in FIG. 1 and as achieved by shifting of the member 10 which has the effect shown in the curve HP of FIG. 3, when the nozzle gap is greater than a reference or smaller than a reference value, respectively. The reference value can be programmed in the computer 100 by the keyboard 104.

It is possible within the scope of the invention to have the profile sleeve 10, controlled by the servomotor 102, react dynamically in accordance with the program curve RWDS and to have the rod 8 reset to enhance or diminish the profiling by the movements in the direction of arrow HP of FIG. 1. The result has been shown in FIG. 2. Namely, the probability of enhancing and diminishing the profile which is determined by a reference profile in the sense of the invention. A dynamic control of the profile sleeve 10 is not critical and it is possible simply to set this sleeve either in an enhancing or diminishing position as required by some manual means or by adjustment via a positioning spindle as will be apparent from FIG. 11a. The number of arcuate lines in the profile 11' will correspond to the number of corners of the finished hollow body which is to be made by blowing the preform in the mold.

Figure 4A:
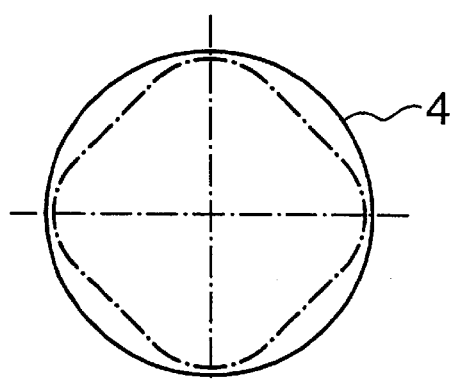
FIGS. 4a–4d are illustrations of the gap geometry in accordance with the state of the art and the invention correlated to the wall thickness program shown in FIG. 3.
Figure 4C:
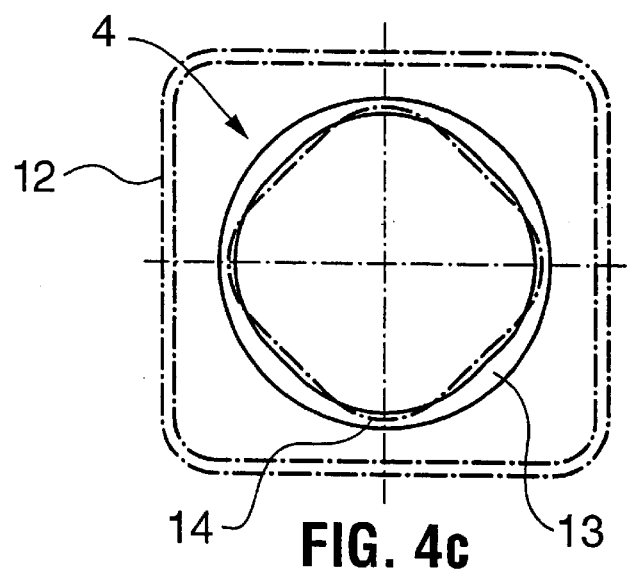
Figure 4B:
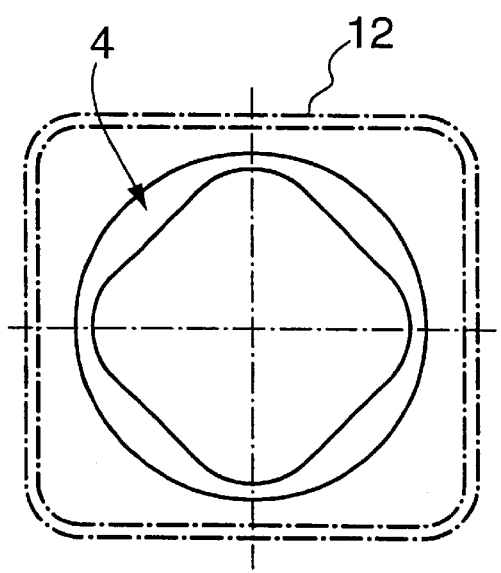
Figure 4D:
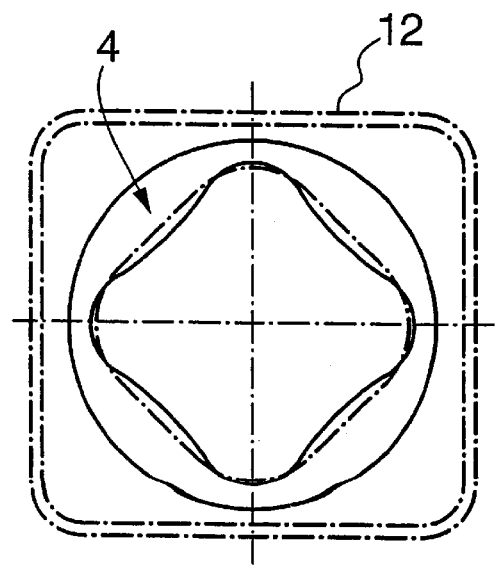

The effect of the process of the invention may be better understood from FIGS. 4a–4d, all of which correspond to diagrammatic cross sections through the nozzle gap 4 and wherein FIG. 4a corresponds to the wall thickness point WDP2 in FIG. 3. FIG. 4B corresponds to the wall thickness points WDP8 and WDP9 of FIG. 3, FIG. 4 corresponds to the wall thickness point WDP11 of FIG. 3 and FIG. 4D corresponds to the wall thickness point WDP18 of FIG. 3. Continuous lines show the profile in accordance with the method of the invention. Broken lines show the profile in a prior art system in which the geometry of the nozzle gap is adjusted independently of the gap with. In dot-dash lines the outer periphery of the hollow body 12 which is to be blown from the preform has been indicated.

From a comparison of FIG. 3 and FIGS. 4a–4d it will be apparent that the combined effect of the progressive change in the gap width by displacement of the mandrel 3 and/or the nozzle ring 2 in dependence upon the first program curve WDS and the superimposition of the effect of enhancement and diminution of the profile thereon giving rise to the program curve HP, permits the ratio of the thick regions and thin regions during the run to be maintained approximately constant, independently of the variation of the nozzle gap width resulting from the first program curve WDS. It will also be apparent from FIG. 3 that the setting of the profile of the gap via the mandrel 3 and/or the nozzle ring 2 for predetermined wall thickness points of the running wall thickness program is a closed operation so that the points WDP3 and WDP23 start and end the program and can coincide geometrically so that nozzle gap is a complete annulus.

The drawbacks of the prior art processes which are overcome by the invention can be recognized by comparing the solid line profile curves with the broken line profile curves in FIGS. 4a–4d. In the case of producing rectangular canisters, with, say a uniform overall wall thickness of 2 mm, the program curves will have the contours shown in FIG. 3. At the wall thickness points WDP8 and WDP9 (FIG. 3) there is an average gap width of 2.5 mm. At the wall thickness point WDP11 there will be a mean gap width of 2 mm and at wall thickness point WDP18, a mean gap width of 4 mm will be required. That assures, as shown in FIG. 3, a starting point for the program at about WDP3 and an end pint at WDP23.

With these settings there is the requisite wall thickness distribution in the length direction and a uniform wall thickness in the peripheral direction as well. The mandrel 3 must be contoured as shown in FIGS. 4a–4d in the broken lines. During the blowing operation in the blow mold, however, the preform is checked both in the peripheral direction and in the longitudinal direction until the plastic material lies against the cooled walls of the blow sold and assumes an outer configuration determined by the cooled inner contour. To achieve the requisite compromise between the upsetting value and stretch for a canister, according to the invention, the profiling of the mandrel at the wall thickness point WDP13 should correspond to the profiling at wall thickness points WDP8 and WDP9 so that the wall thickness overall at the periphery will amount to 2 mm. For a smaller gap width the effect on the profiling is greater than with a wider gap. In that case in the cross section plane, as shown at the wall thickness point WDP11, the corner regions of the canister should be thicker in a set point value. The wall thickness also falls in the cross section plane as indicated at the wall thickness point WDP18 where the corners are thinner which has negative effect on the upsetting value. As a consequence, the invention avoids this problem by maintaining the ratio of the regions to the thin regions approximately constant and the result is an improvement both in the peripheral direction and in the longitudinal direction in the uniformity of the wall thickness of the finished body. The invention thus produces hollow bodies which can have a uniform wall thickness as diagrammatically shown in FIGS. 4a–4d but it can also be used to fabricate hollow bodies which, when finished, are thick and thin regions and in these predetermined wall thicknesses can be maintained even at the corners.

The extrusion blowing head of the invention can have variety of configurations to achieve these results and FIGS. 5a–13 show a number of these possibilities.

Figure 5A:
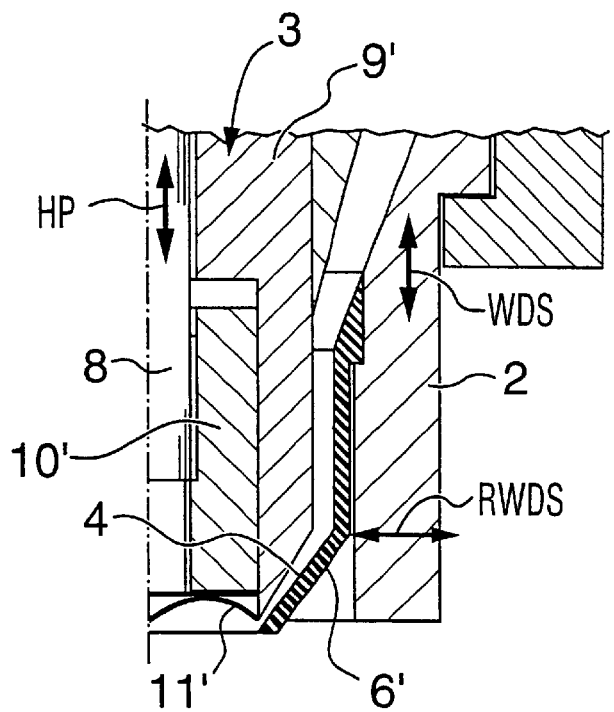
FIG. 5a is a fragmentary axial section through the region of a head for the extrusion of a preform in accordance with another embodiment of the invention.

All of the adjusting devices shown for effecting the nozzle gap geometry can be provided as dynamic controls to respond to the second program curve RWDS and/or the third or other program curve HP. For the method of the invention it is only important that apart from the axial wall thickness control (WDS) that there should be additionally a radial wall thickness control (RWDS) and a third possibility of adjustment or control (HP) or some other means for introducing the enhancement or diminution of profiling to achieve the approximately constant ratio of the thick regions 13 and the thin regions 14 as the preform extruded length increases. In FIG. 5a, the nozzle ring 2 is shown to be axially shiftable. In that case, the nozzle ring 2 is axially shiftable in response to the first program curve WDS which alters the gap width over the entire periphery. The second program curve RWDS operates the effectors which act upon the elastically deformable sleeve 6' which is here held on the nozzle ring 2. The mandrel 3 comprises a ring 9' affixed to the machine frame and having a lower edge with a wave shaped profile 11'. An axially movable sleeve 10' is disposed within the ring 9' of the mandrel 3 and is axially displaced by the rod 8.

Figure 5B:
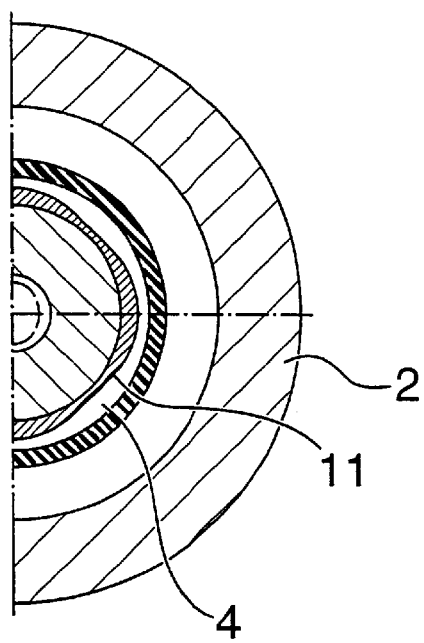
FIG. 5b is a section through this head close to the outlet side of the gap.

The sleeve 10' thus can be axially displaced as represented by the arrow HP in FIG. 5a which blocks or unblocks the wave shape profile 11' to a greater or lesser extent and thus effects the ratio of the thick and thin regions of the thermoplastic melt emerging from the gap. This system permits an adjustment of the gap as schematically shown in FIG. 5b which is a section through the nozzle directly adjacent the outlet.

As soon as the lower edge of the sleeve 10' projects beyond the axially stationary ring 9', the profile 11' become practically ineffective and a uniform gap width results. This creates a uniform wall thickness for the thicker region of the preform as is required for the neck or end region of the blown article.

Figure 6A:
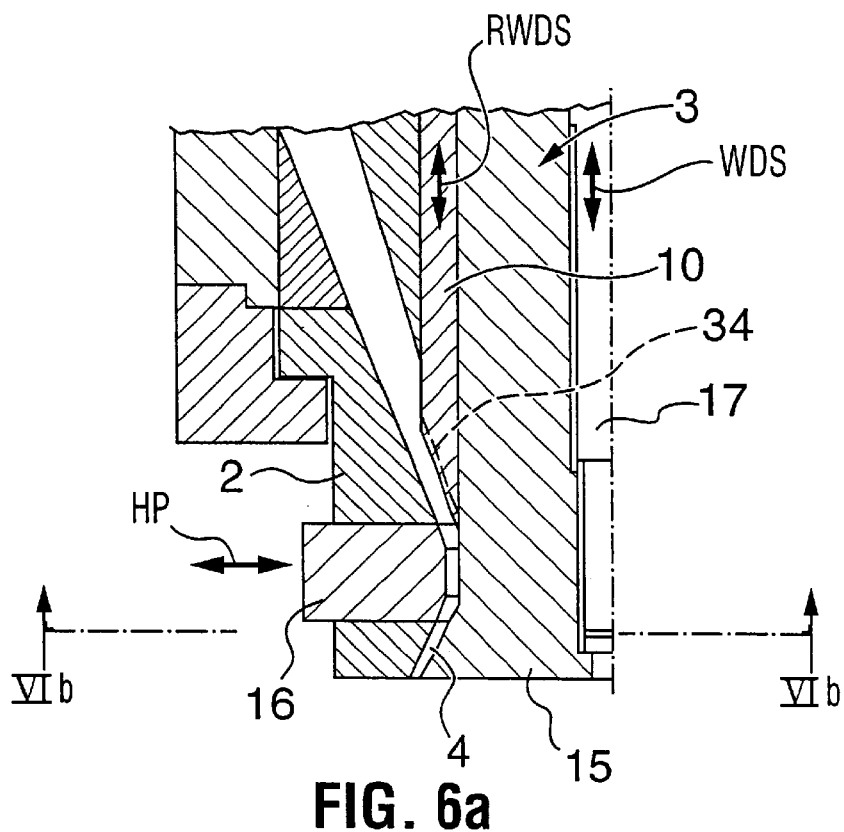
FIG. 6a is a view similar to FIG. 5a of another embodiment.
Figure 6B:
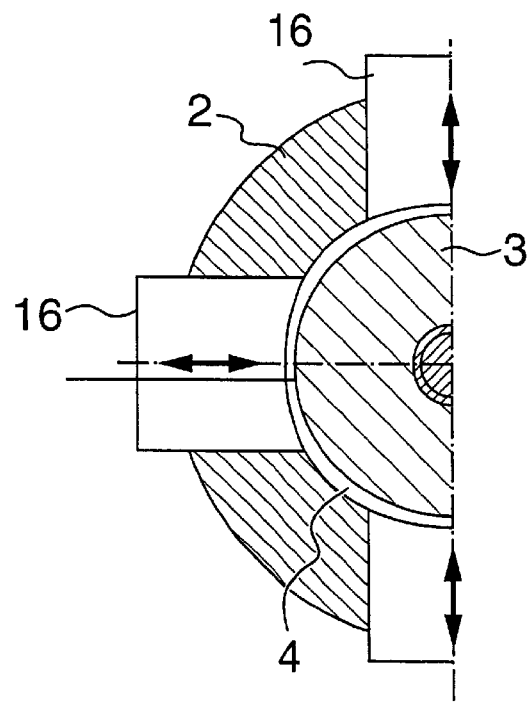

In the configuration at FIG. 6a, the extrusion blow molding head has a mandrel 3 with a mandrel head 15 movable with a positioning rod 17 and a profile sleeve 10 which is axially movable relative to the head 15. The sleeve 10 surrounds an upper portion of the head 15 set back from the lower end and is provided with a contour 35 which is used to shape the flow of the thermoplastic melt. A shifting of the profile sleeve varies the relation between the thick regions and thin regions in the thermoplastic melt flow. The nozzle ring 2 is provided with sliders 16 which control the thick and thin regions of the preform and thus can be connected to respective effectors. When the nozzle gap established by the axial setting of the mandrel head 15 in response to the first program curve WDS is wider, the profiling is enhanced and the profiling is diminished when the nozzle gap is reduced. FIG. 6b shows a section through the head of FIG. 6a along the line VIb—VIb. From this figure it will be apparent that the sliders 16 are arranged in a star pattern. The mandrel 3 is dynamically controlled in response to the first program curve WDS while the profile sleeve 10 is dynamically controlled by the second program curve RWDS. The array of sliders 16 can be controlled by the third program curve (HP) which is related to the first program curve as has been described and/or as a function of the length of the preform extruded from the gap and so controlled that the ratio of the thick and thin regions during the running of the wall thickness program is independent from the gap width determined by the first program curve and remains approximately constant. To reduce the cost of such control operations the sliders 16 can be provided in the mandrel 3.

Figure 7A:
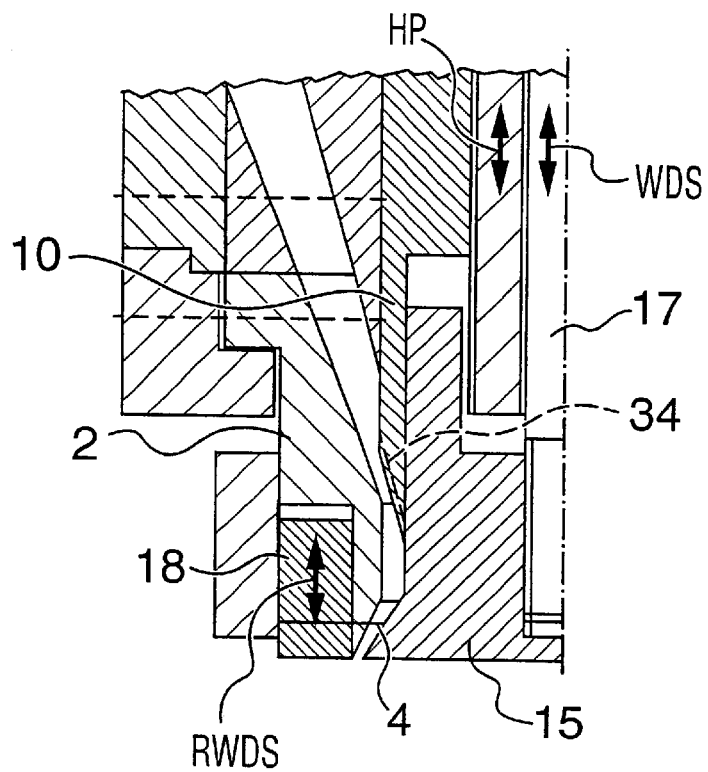
FIG. 7a is a view similar to FIG. 5a but showing another embodiment.
Figure 7B:
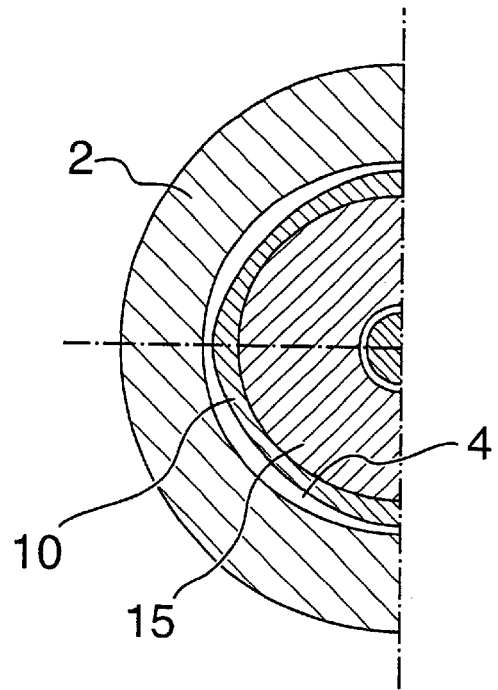
FIG. 7b is a transverse cross section close to the outlet end of that head.

The embodiment of FIGS. 7a and 7b also has a mandrel head 15 movable by the actuating rod 17 in the mandrel 3 and an axially shiftable profile sleeve 10 carried on the mandrel head 15. The profile sleeve 10 surrounds the upper or upstream portion of the nozzle head 15 and has a contour which shapes the melt at 34. Here the nozzle ring 2 is formed with axially shiftable ring segments which are controlled by the program curve RWDS. They act upon the flowable material of the preform emerging from the nozzle gap and generate in the preform depending upon their respective settings, the thick or thin regions. The profile sleeve 10 in this embodiment is controlled in accordance with the further program curve HP and in such manner that the region of the thick and thin regions during the run of the program curve is independent of the nozzle gap width given by the first program curve and remains approximately constant.

In FIGS. 6a and 7a, the profiling 34 is shown to be bevels or surfaces inclined to the profile housing 10. However in accordance with the invention, the profiling 34 can also be formed by a corresponding cutout or recess or recesses of the nozzle ring 2.

Figure 8:
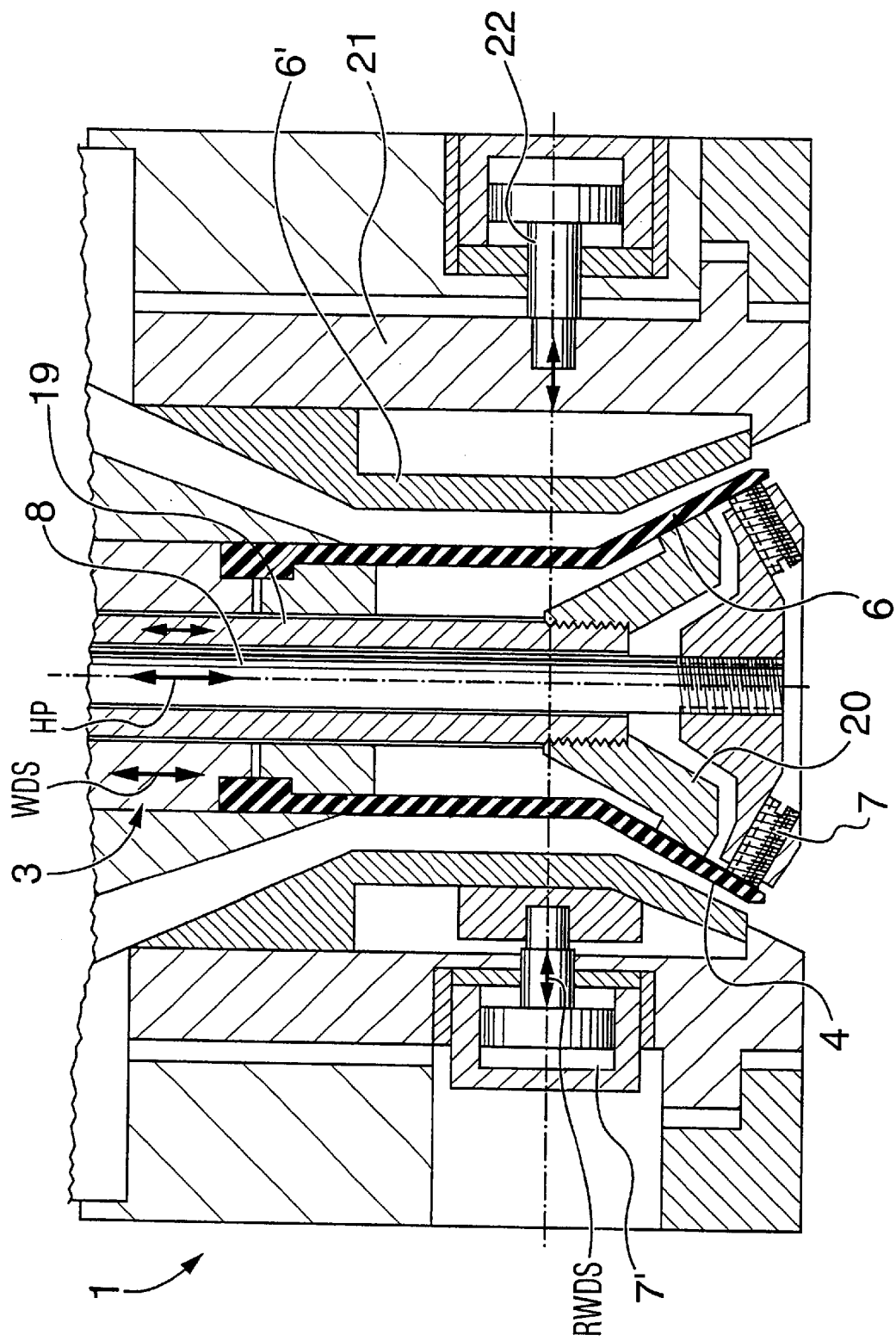
FIG. 8 is an axial section through a part of still another extrusion head according to the invention.

The embodiment of the extrusion blowing head shown in FIG. 8 has a mandrel 3 which is equipped with an elastically deformable sleeve 6 upon which radially acting effector elements 7 in a star pattern act to impart a wave shape to the sleeve in cross section. The effectors 7 are carried on an actuating rod 8 which passes through a tube 19 which is also axially movable in the mandrel 3 and carries auxiliary actuator elements 20, also extending in a star shaped array.

By means of the effectors 7 and the actuators 20 which can be operated independently thereof, the contour of the sleeve 6 can be varied. By actuation of the effectors 7 and/or the auxiliary element 20, thick regions and thin regions can be generated in the flow of the melt and the ratio of the thick and thin regions can be affected.

It is also possible by operation of the actuating elements 20 to reduce the profiling which is imparted to the elastically deformable sleeve 6.

The nozzle ring 2 in the embodiment of FIG. 8 can also be equipped with an elastically deformable sleeve 6' which is engaged by radially oriented effectors 7' capable, upon actuation, of deforming the sleeve 6' on a support ring. The support ring 21 may be made of sectors which themselves can be actuated by the auxiliary effectors 22 which can be angularly equispaced alternatingly with the effectors 7'.

With the system of FIG. 8, the axial position of the mandrel 3 can be controlled in accordance with the first program curve WDS of the wall thickness program to modify the gap width over its entire perimeter.

The elastic sleeve 6' can be deformed in accordance with a second program curve RWDS of the wall thickness program to vary the nozzle gap geometry. By means of the effector 7 and the sleeve 6 of the mandrel 3 the profiling of the preform extruded between the two elastically deformable sleeves 6, 6', can be enhanced when the gap width is greater than a reference value or diminished when the nozzle gap is smaller than the reference value. The setting of the effectors 7 can be controlled by the setting rod 8 in response to the action represented by the arrow HP previously described.

Additional correcting action can be effected by the radial displacement of the support ring to which the elastically deformable sleeve 6' of the nozzle ring 2 is connected. The control process is so carried out that the ratio of the thick and thin regions during the running of the program, i.e. the operations affected by the program curves, remains approximately constant independently of the nozzle gap width given by the first program curve WDS. In addition, the profiling setting of the mandrel 3 or the ring 2 can be initiated or terminated at predetermined values of the wall thickness program which is carried out and/or as a function of the extruded length of the preform from the nozzle gap.

Figure 9:
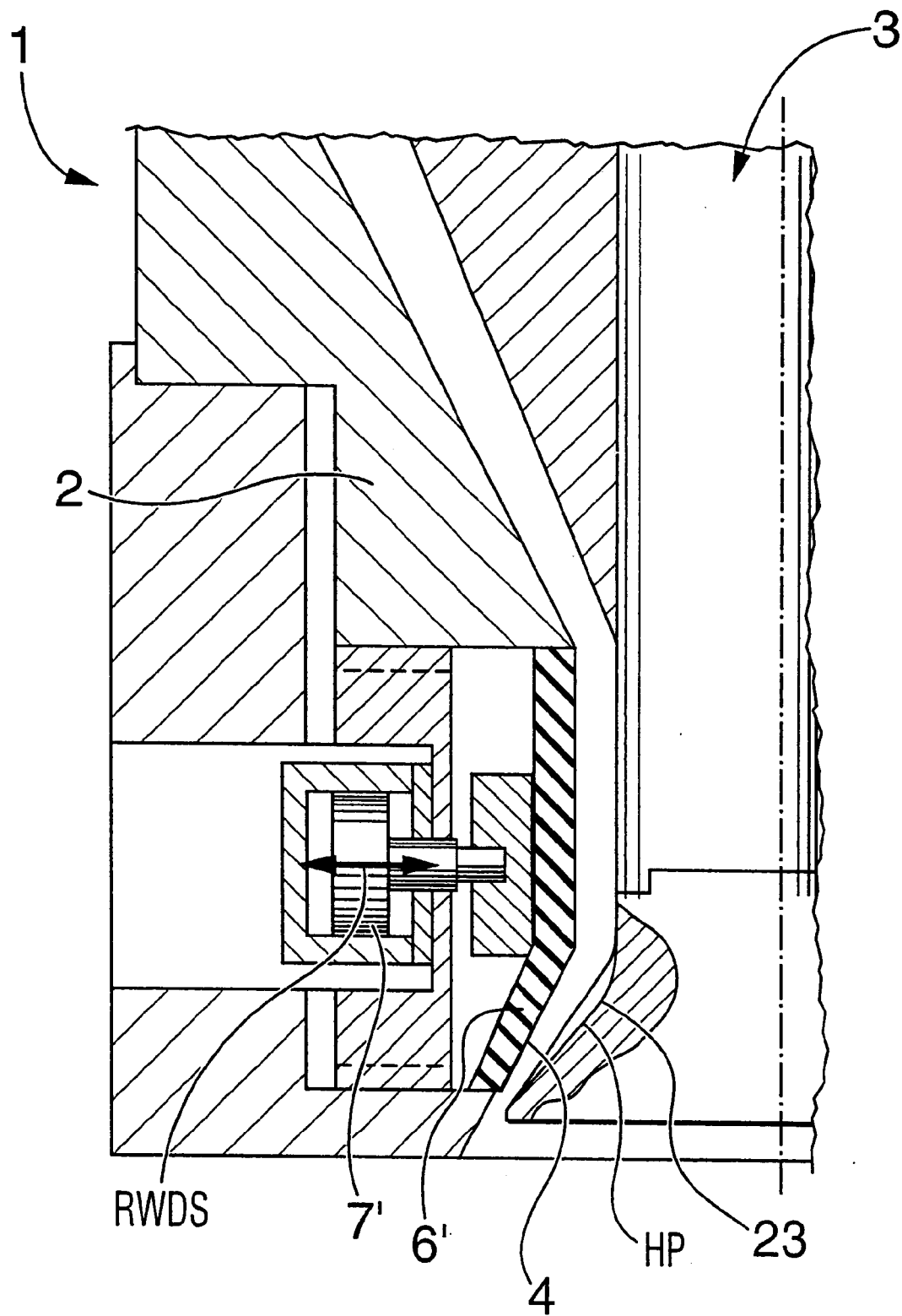
FIG. 9 is a fragmentary axial section through yet another extrusion head.

FIG. 9 shows an embodiment of the extrusion press head in which the nozzle ring 2 is again equipped with an elastically deformable sleeve 6' upon which substantially radially acting effector elements 7' can act in response to servo inputs from the computer. The wall formed by the sleeve 6' is displaceable therefrom toward and away from a conical wall surface of the mandrel 3 which, along its surface affecting the melt, is provided with a wave shaped profile at 23.

As can be seen from FIG. 9, the profiling depth of the profile 23 decreases in the melt flow direction toward the nozzle outlet. The mandrel 3 is axially shiftable in a controlled manner in response to the first program curve WDS of the wall thickness program to vary the nozzle gap width over the entire perimeter. The fact that the profile depth diminishes toward the outlet means that with a displacement of the mandrel 3 in sense so as to increase the nozzle gap width the profile of the nozzle output gap will be enhanced and with a movement of the mandrel to throttle the outflow of the plastic, i.e. to diminish the gap width, the profiling of the gap will be reduced.

The profile 23 of the mandrel has its diminution and configuration selected, with respect to the axial position of the mandrel that the ratio of the thick and thin regions during running of the program remains approximately constant and independent of the predetermined gap width given by the program curve WDS.

The elastically deformable sleeve 6' of the nozzle ring 2 is deformed independently of the shifting of the mandrel 3 itself by the effectors 7' which are controlled in accordance with the second programming curve RWDS of the wall thickness program.

Since the wave shape profile 23 diminishes on the mandrel 3 toward the outlet end and the mandrel narrows to a residual gap, the mandrel can be used to close down the nozzle to a small residual gap width which itself is not a production setting, i.e. thick and thin regions are not produced, so that the end of the mandrel can be so shaped that the profiling is ineffective at nozzle closure.

Figure 10:
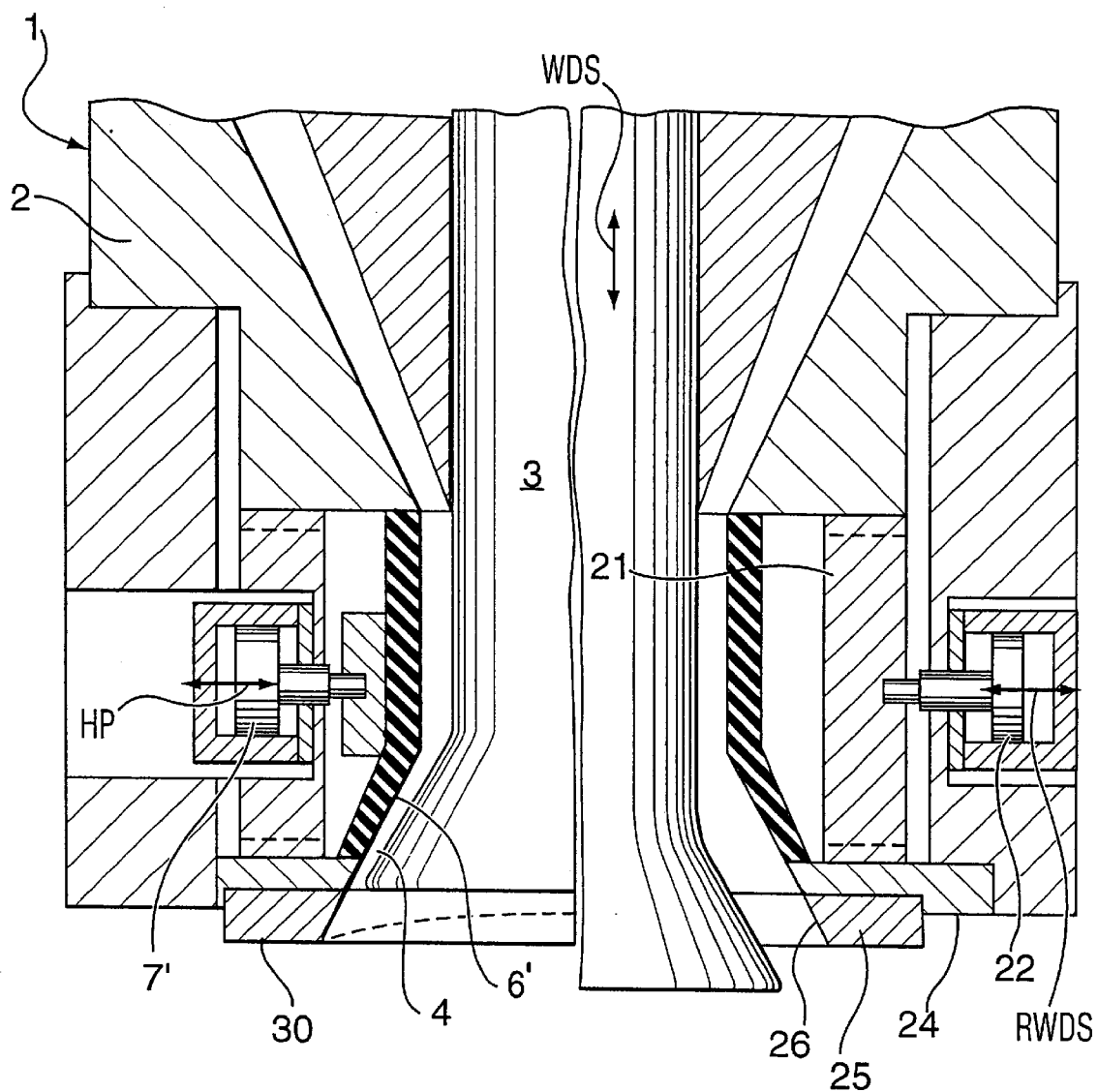
FIGS. 10 and 11a are axial sections illustrating heads for use in the extrusion blow molding of hollow bodies as described.

In the embodiment of FIG. 10, the mandrel 3 has a conical end which is not provided with any profiling. The mandrel 3 is usually shiftable in accordance with a first programming curve WDS of the wall thickness program which varies the nozzle gap width over the entire periphery. The nozzle ring 2 is comprised of a radially movable support ring 21 mounted in the nozzle housing 1 and an elastically deformable sleeve 6' which delimits the melt flow passage.

For the profiling of the sleeve 6' effectors 7' can be provided which are disposed in a star shaped array and are controlled in accordance with a program curve HP such that the ratio of the thick and thin regions during running of the program curve remains approximately constant and independent of the gap width given by the first programming curve WDS.

The effectors 7 and 7' throughout may be fluid cylinders and the servosystem may supply fluid to pressurize the cylinders and actuate the effectors.

Thus for radial displacement of the support ring 21, at least one auxiliary power drive 22, usually also a fluid cylinder, can be mounted on the nozzle housing 1.

From FIG. 10 it will be apparent that, on the underside of the nozzle, there can be a head plate 24 with an annular insert 25. The head plate 24 serves to guide and hold the elastically deformable sleeve 6' and, if desired, the support ring 21. The ring shaped insert 25 is replaceable. The surface 26 turned toward the preform and delimiting the extrusion gap with the mandrel 3 can be provided, if desired, with additional wave-shaped profiling and can generate, in combination with the effector-actuated support ring 21 and depending upon the setting of the mandrel 3 and/or the movement by the effectors 7' of the parts of the flexible sleeve 6', the thick and thin regions in the tubular preform which is extruded from the gap. In this embodiment as well it is possible to profile instead of the inner surface 26, the end face 30 of the insert to achieve the requisite profiling in the preform.

Figure 11A:
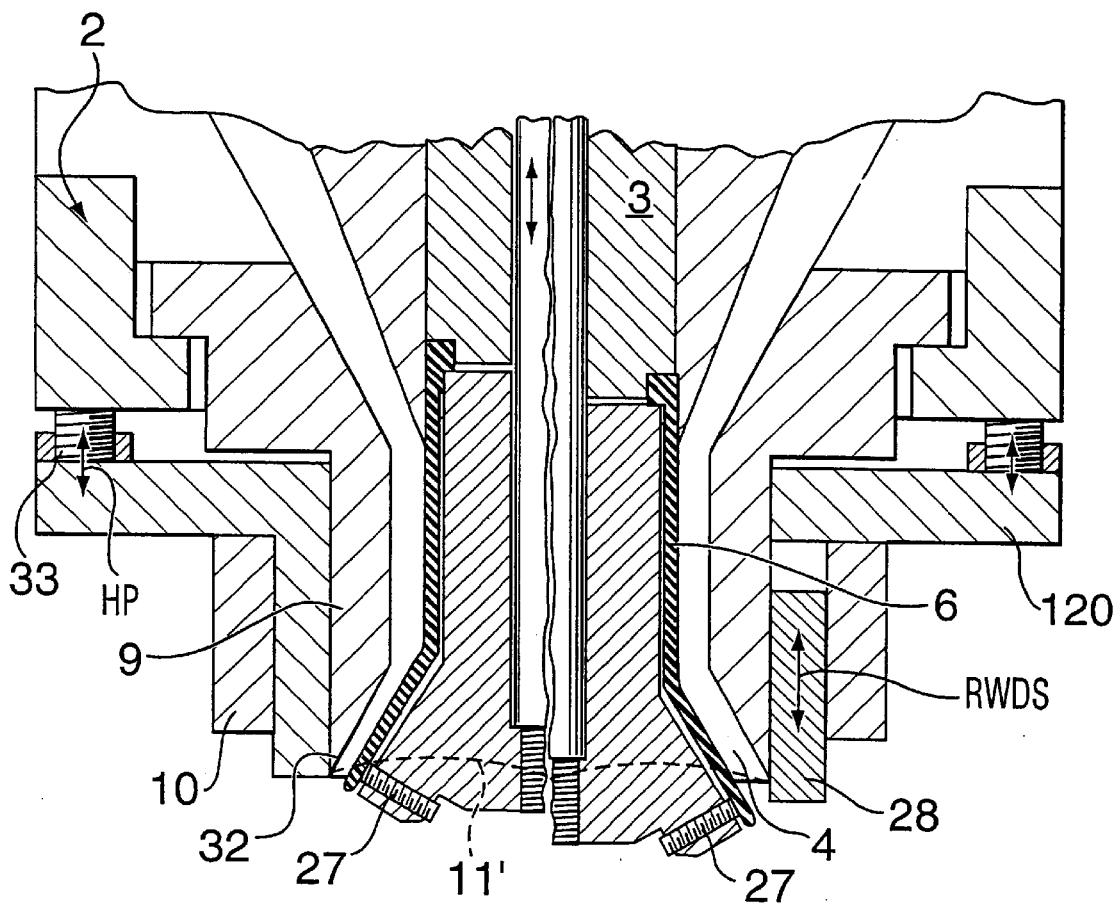
Figure 11B:
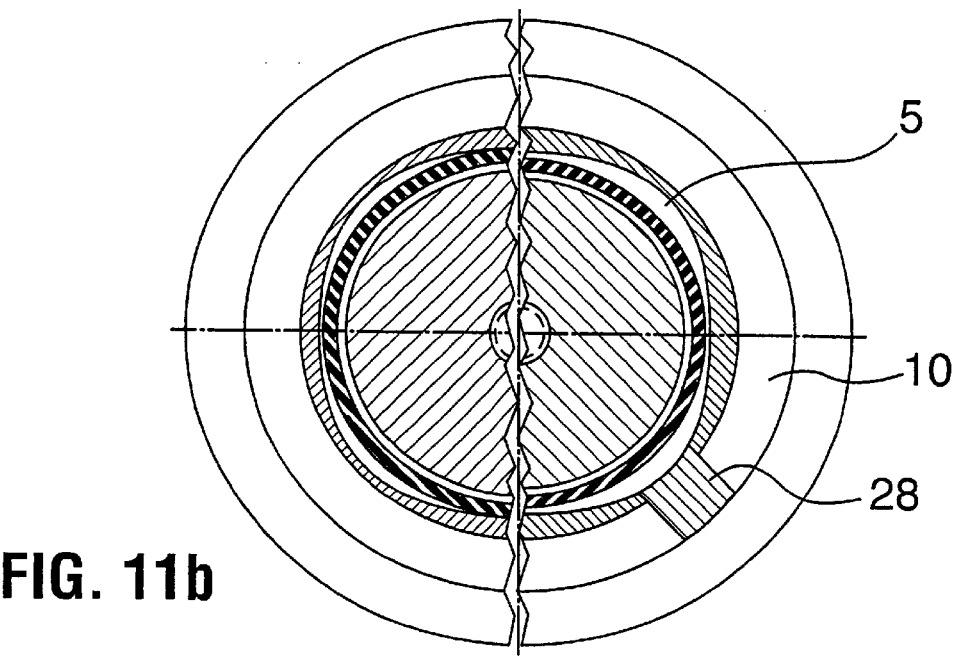
FIG. 11b is a traverse section through the head of FIG. 11a adjacent the end of the gap.

FIGS. 11a and 11b show another embodiment of the extrusion blowing head which utilizes a mandrel 3 having an elastically deformable sleeve 6. The wall profile of the mandrel 3 is adjustable by set screws 27 which act radially upon the sleeve 6.

Depending upon a first program curve WDS of the wall thickness program the axial position of the mandrel 3 is controlled. The gap width is thereby varied over its entire perimeter. The nozzle ring 2 comprises a fixed ring 9 and an axially shiftable profile sleeve 10 which is adjustable via a positioning spindle or group of such spindles angularly offset around the flange 120 of the sleeve 10 and represented at 33. The profile sleeve 10 is formed along its end with the wave shaped profile 11. The profile sleeve 10 is additionally provided with one or more sliders 28 having the shape of ring segments and which are displaceable in the axial direction by respective effectors controlled by the computer and in response to the second program curve RWDS of the wall thickness program to vary the nozzle geometry. The results are thick and thin regions in the extruded preform. The spindles 33 can be adjusted in accordance with the modification HP of the first programing curve to enhance or diminish the profiling as has already been described.

Figure 12:
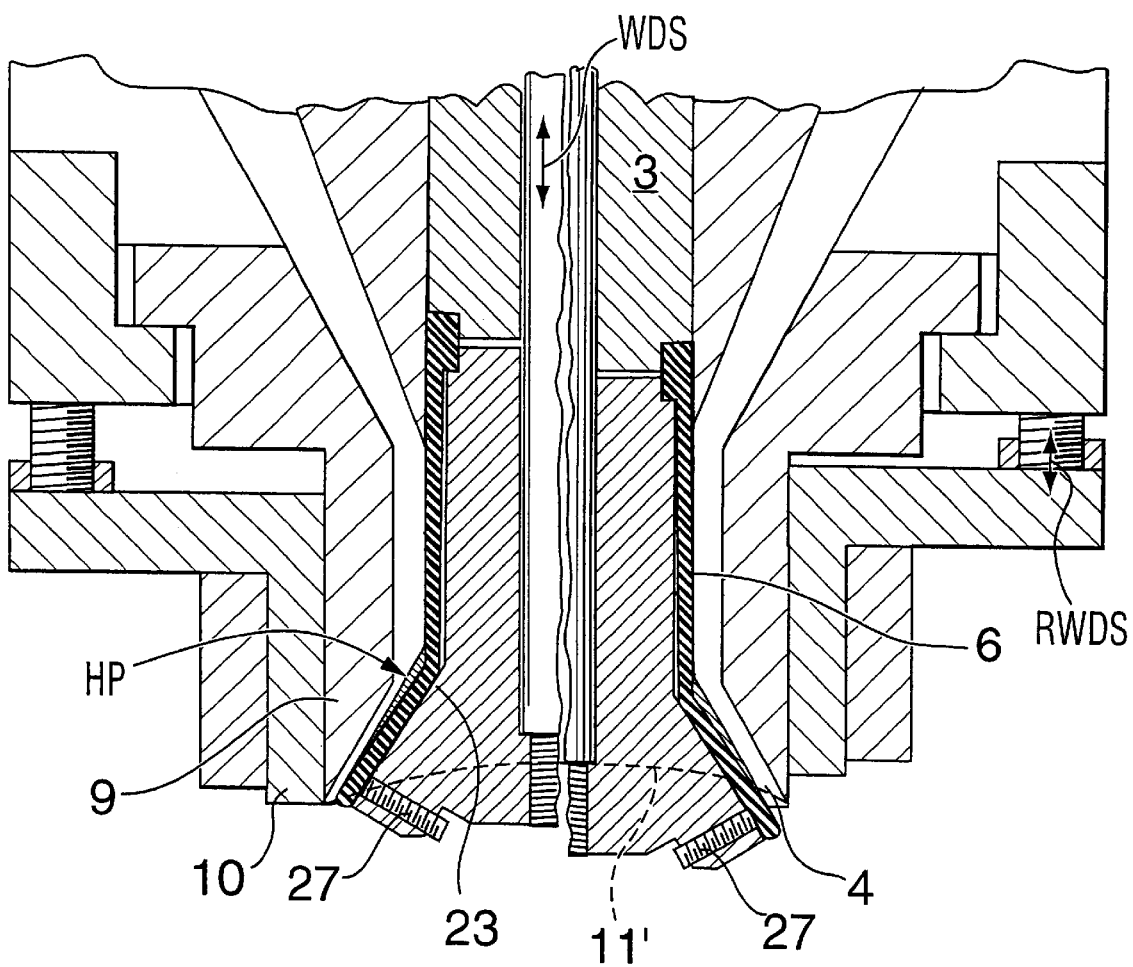
FIG. 12 is an axial section of still another head according to the invention.

FIG. 12 shows an embodiment which differs from that of FIGS. 11a and 11b in that the profile sleeve 10 here has no axially shiftable slider and the wave-shaped profile 11' is not formed on the sleeve 10 but rather at the end face of the fixed ring 9. The conical surface of mandrel 3 or the sleeve 6 mounted on this mandrel is provided at its melt engaging surface with a wave shaped cross section represented at 23 and with a profiling depth which decreases in the melt flow direction toward the nozzle outlet. The profiled sleeve 10 is actuated in accordance with the second programming curve RWDS of the wall thickness program. An appropriate effector displaces the mandrel in accordance with the first programming curve WDS and depending upon the displacement of the mandrel, the profiling is enhanced or diminished in the case of a larger or smaller gap width in the manner described.

Figure 13:
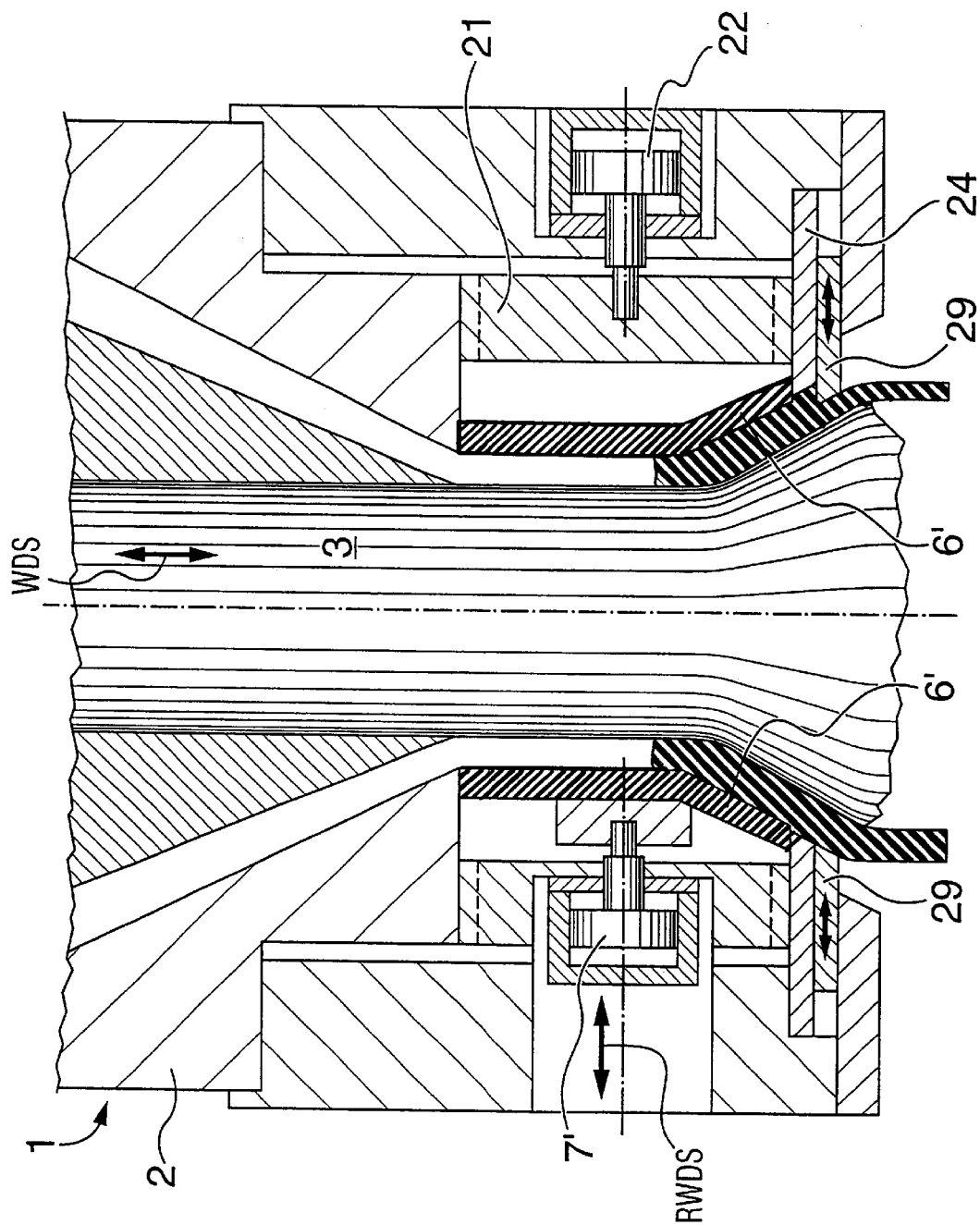
FIG. 13 is an axial section showing a tandem system in which two arrangements for controlling the geometry are provided axially in succession.

The nozzle housing 1 shown in FIG. 13 has radially shiftable sliders 29 which are effective upon the melt extruded from the gap to produce the preform and to define the thick and thin regions in the melt and in the preform. In this arrangement two distinct adjusting devices are provided one downstream of the other, the first being the flexible wall 6' and its effectors 7' and the ring 21 and its effector 22. The apparatus otherwise operates in the manner described in connection with FIG. 10.

Figure 14A:
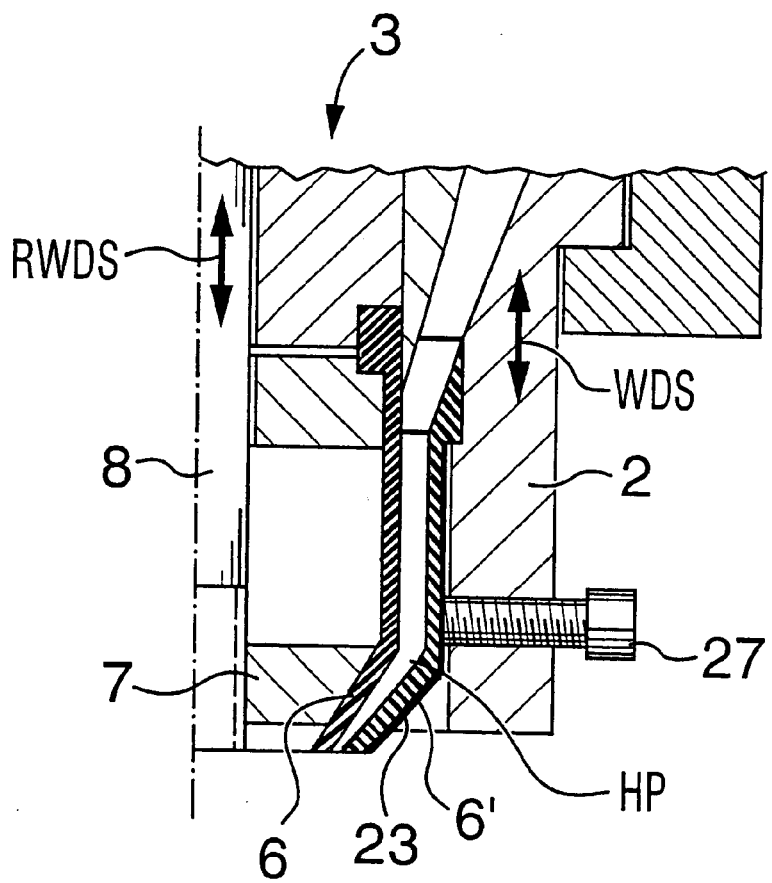
FIG. 14a is a fragmentary axial section through another head.
Figure 14B:
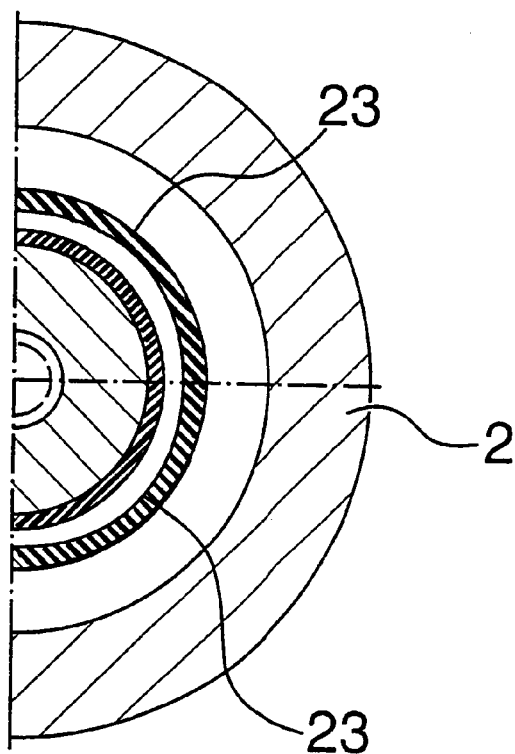
FIG. 14b is a transverse section for this latter head through a portion thereof close to the outlet.

The apparatus shown in FIGS. 14a and 14b has a fixed mandrel 3 with an elastic sleeve 6 which is displaceable by radial effectors 7. The effectors 7 are connected to an actuating rod 8 which is axially shifted in accordance with the second programing curve RWDS for dynamic adjustment of the grip geometry The nozzle ring 2 can undergo axial shifting in accordance with the first programming curve WDS for dynamic regulation of the gap width over the entire periphery. The nozzle ring 2 is equipped with an elastically deformable sleeve 6' whose deformation is adjustable by the set screws 27 in the nozzle ring. The sleeve 6' has a conical configuration at its outlet converging toward the mandrel and shaped to provide at 2 the wave-shaped cross section or profile. The latter is formed by recesses in the sleeve 6' which become shallower toward the outlet.

The displacement to increase the gap width also therefore serves to enhance the profiling of the nozzle gap while the displacement to reduce the gap width also diminishes the profiling. The shape of the profile 23 in the flow direction is so chosen with respect to the stroke in response to the first programing curve WDS that the ratio of the thick and thin regions during the running of the programming curves remains approximately constant independently of the specific gap width determined by the programming curve WDS.

FIG. 14a indicates the shape of the profiling 23 at HP to signify that that shape produces the same effect as the curve HP of FIG. 3. To prevent a partial weakening of the deformable sleeve 6' by the profiling 23, the wall thickness of the wall formed with the profiling 23 can be constant so that this wall as a whole tapers toward the outlet. The sleeve in the region in which the profiling is the greatest, thus has a greater thickness than at the region of the nozzle outlet. The system of the invention thus permits the flow of the melt through the nozzle gap to be influenced by a variety of devices and arrangements which can be combined to achieve the results described although in all embodiments the nozzle ring 2 and/or a part of the nozzle, for example the support ring 21, can be shifted relative to the mandrel.

We claim:

1. A method of extrusion blow molding hollow bodies comprising the steps of:
    (a) extruding a tubular preform through an extrusion-nozzle gap externally delimited by a nozzle ring and internally delimited by a mandrel wherein said ring and said mandrel are relatively axially shiftable to vary a gap width;
    (b) automatically controlling said gap width and a geometry of the extrusion-nozzle gap in response to at least one control variable selected from a wall-thickness program and an extruded length of the preform by at least the steps of:
        (b1) varying the gap width over an entire perimeter of the gap by axially shifting at least one of said ring and said mandrel in accordance with a first program curve (WDS) of said wall-thickness program, and
        (b2) varying said geometry with at least one effector in response to a second program curve (RWDS) of said wall-thickness program;
    (c) forming at least one of said mandrel and said ring with a cross sectional shape selectively generating thick regions and thin regions of a synthetic resin melt as it is extruded through said gap to produce said preform and independently of the variation in said geometry in response to the second program curve (RWDS) of said wall-thickness program;
    (d) enhancing a profiling of said preform to increase differences between said thick and thin regions with said variation in geometry when said gap width is greater than a reference value and diminishing the profiling of said preform to decrease differences between said thick and thin regions with said variation in geometry when said gap width is less than the reference value; and
    (e) blowing said preform in a blow sold to produce one of said hollow bodies from each preform extruded from said gap.

2. The method defined in claim 1 wherein a further program curve (HP) is generated as a function of said first program curve (WDS) and at least one of said ring and said mandrel is controlled in response to said further program curve and said control variable so that a ratio of thick-region thicknesses to thin-region thicknesses remains approximately constant independently of a gap width dictated by said first program curve (WDS).

3. The method defined in claim 1 wherein a further program curve (HP) is generated as a function of said first program curve (WDs) of the wall-thickness program by multiplying values of said first program curve by a profile factor (F) where F<1, and the enhancing and diminishing of said profiling is effected in accordance with said further program curve (HP).

4. The method defined in claim 1 wherein the profile setting of at least one of the mandrel and the ring is initiated or terminated at predetermined values of a running of the wall-thickness program or as a function of the length of the extruded preform.

5. The method defined in claim 1 wherein the enhancing and diminishing of the profiling is effected by axially shifting relatively said ring and a sleeve to control which of said ring and said sleeve define said gap, at least one of said ring and said sleeve having an end forming a wave shape in the cross section of the extruded preform.

6. The method defined in claim 1 wherein one of said mandrel and said ring is formed with an elastically deforuable wall delimiting said gap and provided with respective substantially radially shiftable effectors defining the cross sectional geometry of said gap.

7. The method defined in claim 1 wherein gap width and geometry are defined by operating two adjusting devices provided one downstream of the other in a direction of extrusion of said preform.

8. The method defined in claim 1 wherein at least one of said ring and said mandrel is provided with at least one slider affecting flow of said melt and said slider is adjusted to influence a ratio between the thick and thin regions.

9. The method defined in claim 1 wherein said mandrel is provided with an axially shiftable mandrel head and an axially shiftable profile sleeve coaxial with said mandrel, said profile sleeve having a surface juxtaposed with a surface on said ring, at least one of said surfaces shaping said melt, said method comprising shifting said profile sleeve to alter said thick and thin regions.

10. The method defined in claim 1 wherein at least one of said ring and said mandrel has at least a part acting upon said melt, said method comprising shifting said part to affect a ratio of said thick and thin regions.

11. The method defined in claim 1 wherein said mandrel has a conical surface and at least one of said ring and said conical surface has a wave-shaped profile defining a wave-shaped cross section of said preform, said mandrel having a depth of the wave shape which decreases toward an outlet side of said gap, said method being effected so that with a movement of one of said mandrel and said ring to increase the gap width, the profiling of the gap is enhanced, and with a movement of one of said mandrel and said ring to decrease the gap width, the profiling of said gap is diminished.

12. The method defined in claim 1 wherein at least one of said ring and said mandrel is formed with an elastic sleeve and with generally radial effectors imparting a wave shape to said sleeve, thereby shaping said melt, said sleeve having a depth of the wave shape which decreases toward an outlet side of said gap, said method being effected so that with a movement of one of said mandrel and said ring to increase the gap width, the profiling of the gap is enhanced, and with a movement of one of said mandrel and said ring to decrease the gap width, the profiling of said gap is diminished.

13. The method defined in claim 1, further comprising the step of feeding said melt along a passage to said gap along at least one conical wall formed with recesses producing a wave-shaped profiling of said preform, said passage having a wall upstream of said recesses and shaped to direct flow of said melt into said recesses of said conical wall.

14. The method defined in claim 1, further comprising the step of feeding said melt along a passage to said gap along at least one conical wall formed with profiling producing a wave-shaped cross section of said preform and diminishing in depth toward an outlet side of said gap, said mandrel and said nozzle ring being substantially rotationally symmetrical in an absence of deformation to alter said geometry, and said gap being substantially closed in an end position of said mandrel and said ring.

* * * * *